United States Patent
Kadatch et al.

(10) Patent No.: US 8,996,887 B2
(45) Date of Patent: Mar. 31, 2015

(54) LOG STRUCTURED VOLUME ENCRYPTION FOR VIRTUAL MACHINES

(75) Inventors: Andrew Kadatch, Redmond, WA (US); Michael A. Halcrow, Bellevue, WA (US)

(73) Assignee: Google Inc., Mountain View, CA (US)

(*) Notice: Subject to any disclaimer, the term of this patent is extended or adjusted under 35 U.S.C. 154(b) by 46 days.

(21) Appl. No.: 13/405,036

(22) Filed: Feb. 24, 2012

(65) Prior Publication Data

US 2013/0227303 A1    Aug. 29, 2013

(51) Int. Cl.
   H04L 29/06    (2006.01)
   H04L 9/08    (2006.01)

(52) U.S. Cl.
   CPC .......... H04L 9/0891 (2013.01); H04L 9/0894 (2013.01); H04L 63/0823 (2013.01); H04L 63/0435 (2013.01); H04L 63/0478 (2013.01)
   USPC .............. 713/193; 713/168; 713/181; 726/7; 726/27; 380/45; 380/278

(58) Field of Classification Search
   CPC .......... H04L 63/0435; H04L 63/0823; H04L 63/0471; H04L 63/068; H04L 9/0891; H04L 9/0894
   USPC .............. 726/2–6, 7, 26, 27; 713/2, 168, 193, 713/181; 380/44, 45, 277, 278, 287
   See application file for complete search history.

(56) References Cited

U.S. PATENT DOCUMENTS

| | | |
|---|---|---|
| 5,463,768 A | 10/1995 | Cuddihy et al. |
| 5,655,081 A | 8/1997 | Bonnell et al. |
| 5,778,444 A | 7/1998 | Langan et al. |
| 6,178,482 B1 | 1/2001 | Sollars |
| 6,505,211 B1 | 1/2003 | Dessloch et al. |
| 6,505,248 B1 | 1/2003 | Casper et al. |
| 6,587,866 B1 | 7/2003 | Modi et al. |
| 6,598,179 B1 | 7/2003 | Chirashnya et al. |

(Continued)

FOREIGN PATENT DOCUMENTS

WO    WO 2011/095516    8/2011

OTHER PUBLICATIONS

Cabellos et al., LISPmob: Mobile Networking through LISP, Apr. 2, 2012, 8 pages.

(Continued)

*Primary Examiner* — Hadi Armouche
*Assistant Examiner* — Hee Song
(74) *Attorney, Agent, or Firm* — Fish & Richardson P.C.

(57) ABSTRACT

Methods, systems, and apparatus, including a method for providing data. The method comprises receiving a first request from a first virtual machine (VM) to store data, obtaining the data and an access control list (ACL) of authorized users, obtaining a data key that has a data key identifier, encrypting the data key and the ACL using a wrapping key to generate a wrapped blob, encrypting the data, storing the wrapped blob and the encrypted data, and providing the data key identifier to users on the ACL. The method further comprises receiving a second request from a second VM to obtain a data snapshot, obtaining an unwrapped blob, obtaining the data key and the ACL from the unwrapped blob, authenticating a user associated with the second request, authorizing the user against the ACL, decrypting the data using the data key, and providing a snapshot of the data to the second VM.

21 Claims, 10 Drawing Sheets

(56) References Cited

U.S. PATENT DOCUMENTS

| | | | |
|---|---|---|---|
| 6,643,613 B2 | 11/2003 | McGee et al. | |
| 6,891,839 B2 | 5/2005 | Albert et al. | |
| 6,898,697 B1 | 5/2005 | Gao et al. | |
| 6,996,502 B2 | 2/2006 | De La Cruz et al. | |
| 7,043,455 B1 | 5/2006 | Cuomo et al. | |
| 7,062,718 B2 | 6/2006 | Kodosky et al. | |
| 7,111,005 B1 | 9/2006 | Wessman | |
| 7,117,243 B2 | 10/2006 | Peart | |
| 7,466,703 B1 | 12/2008 | Arunachalam et al. | |
| 7,478,388 B1 | 1/2009 | Chen et al. | |
| 7,500,262 B1 | 3/2009 | Sanin et al. | |
| 7,529,836 B1 | 5/2009 | Bolen et al. | |
| 7,596,620 B1 | 9/2009 | Colton et al. | |
| 7,650,331 B1 | 1/2010 | Dean et al. | |
| 7,653,833 B1 | 1/2010 | Miller et al. | |
| 7,761,573 B2 | 7/2010 | Travostino et al. | |
| 7,804,862 B1 | 9/2010 | Olson et al. | |
| 7,827,403 B2 | 11/2010 | Wong et al. | |
| 7,836,285 B2 | 11/2010 | Giri et al. | |
| 8,065,717 B2 | 11/2011 | Band | |
| 8,103,771 B2 | 1/2012 | Tanaka et al. | |
| 8,108,903 B2 | 1/2012 | Norefors et al. | |
| 8,146,147 B2 | 3/2012 | Litvin et al. | |
| 8,189,790 B2 * | 5/2012 | Bilodi et al. | 380/277 |
| 8,261,295 B1 | 9/2012 | Risbood et al. | |
| 8,296,459 B1 | 10/2012 | Brandwine et al. | |
| 8,452,015 B2 | 5/2013 | Gassoway | |
| 8,484,353 B1 | 7/2013 | Johnson et al. | |
| 8,504,844 B2 * | 8/2013 | Browning | 713/189 |
| 2002/0091902 A1 | 7/2002 | Hirofuji | |
| 2002/0097747 A1 | 7/2002 | Kirkby | |
| 2004/0139368 A1 | 7/2004 | Austen et al. | |
| 2005/0010715 A1 | 1/2005 | Davies et al. | |
| 2005/0166011 A1 | 7/2005 | Burnett et al. | |
| 2005/0196030 A1 | 9/2005 | Schofield et al. | |
| 2005/0237543 A1 | 10/2005 | Kikuchi | |
| 2005/0289499 A1 | 12/2005 | Ogawa et al. | |
| 2006/0048077 A1 | 3/2006 | Boyles | |
| 2006/0059228 A1 | 3/2006 | Kasamsetty et al. | |
| 2006/0067236 A1 | 3/2006 | Gupta | |
| 2006/0098618 A1 | 5/2006 | Bouffioux | |
| 2006/0136676 A1 | 6/2006 | Park et al. | |
| 2006/0153099 A1 | 7/2006 | Feldman | |
| 2006/0161753 A1 | 7/2006 | Aschoff et al. | |
| 2007/0076886 A1 | 4/2007 | Hori | |
| 2007/0112956 A1 | 5/2007 | Chapman et al. | |
| 2007/0118694 A1 | 5/2007 | Watanabe et al. | |
| 2007/0123276 A1 | 5/2007 | Parker et al. | |
| 2007/0177198 A1 | 8/2007 | Miyata | |
| 2007/0199058 A1 | 8/2007 | Baumgart et al. | |
| 2007/0271604 A1 | 11/2007 | Webster et al. | |
| 2007/0280243 A1 | 12/2007 | Wray et al. | |
| 2007/0288921 A1 | 12/2007 | King et al. | |
| 2008/0086515 A1 | 4/2008 | Bai et al. | |
| 2008/0095176 A1 | 4/2008 | Ong et al. | |
| 2008/0107112 A1 | 5/2008 | Kuo et al. | |
| 2008/0205415 A1 | 8/2008 | Morales | |
| 2008/0208681 A1 * | 8/2008 | Hammad et al. | 705/13 |
| 2008/0215796 A1 | 9/2008 | Lam et al. | |
| 2008/0222246 A1 | 9/2008 | Ebling et al. | |
| 2008/0222375 A1 | 9/2008 | Kotsovinos et al. | |
| 2008/0244471 A1 | 10/2008 | Killian et al. | |
| 2008/0270704 A1 | 10/2008 | He et al. | |
| 2008/0304516 A1 | 12/2008 | Feng et al. | |
| 2008/0307258 A1 | 12/2008 | Challenger et al. | |
| 2009/0097657 A1 | 4/2009 | Scheidt et al. | |
| 2009/0150629 A1 | 6/2009 | Noguchi et al. | |
| 2009/0199177 A1 | 8/2009 | Edwards et al. | |
| 2009/0222815 A1 | 9/2009 | Dake | |
| 2009/0241108 A1 | 9/2009 | Edwards et al. | |
| 2009/0249440 A1 | 10/2009 | Platt et al. | |
| 2009/0276771 A1 | 11/2009 | Nickolov et al. | |
| 2009/0300605 A1 | 12/2009 | Edwards et al. | |
| 2009/0310554 A1 | 12/2009 | Sun et al. | |
| 2010/0017859 A1 | 1/2010 | Kelly | |
| 2010/0023582 A1 | 1/2010 | Pedersen et al. | |
| 2010/0046426 A1 | 2/2010 | Shenoy et al. | |
| 2010/0057913 A1 | 3/2010 | Dehaan | |
| 2010/0071035 A1 | 3/2010 | Budko et al. | |
| 2010/0094999 A1 | 4/2010 | Rama et al. | |
| 2010/0095000 A1 | 4/2010 | Kettler et al. | |
| 2010/0199089 A1 | 8/2010 | Vysogorets et al. | |
| 2010/0212004 A1 | 8/2010 | Fu | |
| 2010/0215050 A1 | 8/2010 | Kanada | |
| 2010/0217927 A1 | 8/2010 | Song | |
| 2010/0235649 A1 * | 9/2010 | Jeffries et al. | 713/189 |
| 2010/0287548 A1 | 11/2010 | Zhou et al. | |
| 2010/0293285 A1 | 11/2010 | Oishi et al. | |
| 2010/0303241 A1 * | 12/2010 | Breyel | 380/277 |
| 2011/0010483 A1 | 1/2011 | Liljeberg | |
| 2011/0022812 A1 | 1/2011 | van der Linden et al. | |
| 2011/0055361 A1 | 3/2011 | DeHaan | |
| 2011/0078363 A1 | 3/2011 | Yeh et al. | |
| 2011/0085563 A1 | 4/2011 | Kotha et al. | |
| 2011/0103389 A1 | 5/2011 | Kidambi et al. | |
| 2011/0153697 A1 | 6/2011 | Nickolov et al. | |
| 2011/0153838 A1 | 6/2011 | Belkine et al. | |
| 2011/0191485 A1 | 8/2011 | Umbehocker | |
| 2011/0231280 A1 | 9/2011 | Farah | |
| 2011/0258441 A1 | 10/2011 | Ashok et al. | |
| 2012/0060018 A1 | 3/2012 | Shinde et al. | |
| 2012/0063458 A1 | 3/2012 | Klink et al. | |
| 2012/0179796 A1 | 7/2012 | Nagaraj et al. | |
| 2012/0185688 A1 | 7/2012 | Thornton | |
| 2012/0191912 A1 | 7/2012 | Kadatch et al. | |
| 2012/0204030 A1 * | 8/2012 | Nossik et al. | 713/168 |
| 2012/0233678 A1 | 9/2012 | Pal | |
| 2012/0233705 A1 | 9/2012 | Boysen et al. | |
| 2012/0246637 A1 | 9/2012 | Kreeger et al. | |
| 2013/0145161 A1 * | 6/2013 | Pedlow et al. | 713/168 |
| 2013/0305039 A1 * | 11/2013 | Gauda | 713/153 |

OTHER PUBLICATIONS

Steinmetz, Christof, Authorized Office for European Patent Office, International Search Report and Written Opinion for PCT/US2013/034140, completed Jun. 25, 2013, 21 pages.

Hehn, Eva, Authorized Office for European Patent Office, International Search Report and Written Opinion for PCT/US2013/027456, completed Jun. 24 2013,11 pages.

Eng, Lili, Australian Government, IP Australia, Examiner's First Report for 2012200562, dated Jun. 4, 2012, 2 pages.

Moller, Jan, et al., "Internal Network Security", Feb. 1, 2000-May 18, 2001, Retrieved from the Internet: <URL: http://www.daimi.au.dk/~fwiffo/thesis/>, 183 pages.

Primet, Pascale, et al.., "HIPCAL: State of the Art of OS and Network virtualization solutions for Grids", Sep. 14, 2007, 38 pages.

Abdull, AlastairIrvine, et al. "Generic Routing Encapsulation", [online] [retrieved on Jan. 4, 2011]. Retrieved from the Internet: <URL: http://creativecommons.org/licenses/by-sa/3.0/>, 5 pages.

Farinacci et al., "RFC 2784: Generic Routing Encapsulation (GRE)", Mar. 2000, The Internet Society, 10 pages.

Kent et al., "RFC 4301: Security Architecture for the Internet Protocol", Dec. 2005, The Internet Society, 102 pages.

Wikipedia, "Domain Name System" [online]; Feb. 4, 2012; [Retrieved on Feb. 4, 2012]. Retrieved from the Internet: <URL: http://en.wikipedia.org/wiki/Domain_Name_System>, 16 pages.

Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key.html>, 1 page.

Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.

Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.

Wikipedia. "OAuth." [online], Dec. 12, 2010; [Retrieved on Jan. 20, 2011] Retrieved from the Internet <URL: http://en.wikipedia.org/wiki/OAuth>; 3 pages.

(56) References Cited

OTHER PUBLICATIONS

Gowalla. "API Documentation—Oauth." [Retrieved on Apr. 26, 2011]. Retrieved from the Internet <URL: http://gowalla.com/api/docs/oauth>, 4 pages.
Apache HTTP Server Version 2.0. "Log Files." [Retrieved on Feb. 15, 2011]. Retrieved from the Internet <URL: http://httpd.apache.org/docs/2.0/logs.html>, 7 pages.
Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.
MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.
Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.
Wikipedia., Anycast [Retrieved on Oct. 10, 2011] Retrieved from the Internet: URL<http://en.wikipedia.org/wiki/Anycast>, 5 pages.
VMCI Overview [Retrieved on Jun. 8, 2011] Retrieved from the Internet: <URL: http://pubs.vmware.com/vmci-sdk/VMCI_intro.html>, 3 pages.
VMware vSphere [Retrieved on Jun. 8, 2011] Retrieved from the Internet: <URL: http://www.vmware.com/products/vmotion/overview.html>, 2 pages.
VMCI Datagram API [Retrieved on Jun. 8, 2011], Retrieved from the Internet: <URL: http://pubs.vmware.com/vmci-sdk/datagram.html>, 1 page.
VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.
VMCIDs_Lookup [Retrieved on Jun. 8, 2011], Retrieved from the Internet: <URL: http://pubs.vmware.com/vmci-sdk/functions/VMCIDs_Lookup.html>, 2 pages.
Chen, Per M., et al., : "Maximizing Performance in a Striped Disk Array", 17th Annual International Symposium on Computer Architecture (SIGARCH 1990), 18 pages.
Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.
Vazhkudai, Sudharshan S., et al.; "Constructing Collaborative Desktop Storage Caches for Large Scientific Datasets"; ACM Journal Name, vol. V, No. N, Jun. 2006, 34 pages.
OMG, Deployment and Configuration of Component-based Distributed Applications Specification—Version 4.0, OMG, 2006, pp. 1-160.
Cala et al., "Automatic Software Deployment in the Azure Cloud", IFIP International Federation for Information Processing, 2010, pp. 1-14.
RSA Laboratories, "PKCS #11 v2.20: Cryptographic Token Interface Standard," Jun. 28, 2004, RSA Security Inc. (407 pages).
Amazon Auto Scaling—Getting Started Guide—API Version Aug. 1, 2010. Amazon Web Services LLC, 2010, 20 pages.
Amazon Auto Scaling—Developer Guide—API Version Aug. 1, 2010. Amazon Web Services LLC, 2011, 62 pages.
Amazon CloudWatch—Developer Guide—API Version Aug. 1, 2010. Amazon Web Services LLC, 2010, 75 pages.
Benincosa. "Ganglia and Nagios, Part 2: Monitor enterprise clusters with Nagios-Install Nagios to effectively monitor a data center; make Ganglia and Nagios work together," 2009, 20 pages.
'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.
'Nagios' [online]. "Nagios Plugins," 2011, [retrieved on Feb. 3. 2011]. Retrieved from the Internet: URL: <http://nagios.sourceforge.net/docs/3_0/plugins.html > 2 pages.
'Zabbix' [online]. "Zabbix 1.8: The Ultimate Open Source Monitoring Solution," 2001-2012, [retrieved on Feb. 3, 2011]. Retrieved from the Internet: URL: <http://www.zabbix.com/features.php.> 1 page.
Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.
Paravirtualization, Wikipedia Article, downloaded from http://en.wikipedia.org/wiki/Paravirtualization on Mar. 18, 2012.
Paravirtualized File Systems, Eric Van Hensbergen, downloaded from http://www.slideshare.net/ericvh/9p-on-kvm on Mar. 18, 2012.
"IPsec". Creativecommons.org [online]. Creative Commons Attribution-Share Alike 3.0 Unported, Nov. 11, 2010; [Retrieved on Jan. 14, 2011] Retrieved from the Internet: <URL: http://en.wikipedia.org/w/index.php?oldid=396193389>; pp. 1-8.
"Generic Routing Encapsulation". Creativecommons.org [online]. Creative Commons Attribution-Share Alike 3.0 Unported, Nov. 12, 2010; [Retrieved on Jan. 14, 2011]; Retrieved from the Internet: <URL: http://en.wikipedia.org/w/index.php?oldid=396280384>; pp. 1-5.
Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.
How to: Getting Started With Amazon EC2, Paul Stamatiou, Apr. 5, 2008. Retrieved from the Internet: <URL:http//paulstamatiou.com/how-to-getting-started-with-amazon-ec2>, 25 pages.
Uploading Personal ssh Keys to Amazon EC2, Eric Hammond, Oct. 14, 2010. Retrieved from the Internet: <URL:http://alestic.com/2010/10/ec2-ssh-keys>, 3 pages.
Key Management in Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.
Managing Amazon EC2—SSH Login and Protecting Your Instances, Everyday's Findings, Monday, May 18, 2009, Retrieved from the Internet on Nov. 18, 2011; Retrieved from: <URL: http://blog.taggesell.de/index.php?/aarchives/73-Managing-Amazon-EC2., 6 pages.
Using and Managing AWS—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.
L. Gommans, et al., Token-Based Authorization of Connection Oriented Network Resources, 1st International Workshop on Networks for Grid Applications (Grid Nets 2004), Oct. 29, 2004; 8 pages.
Hyun, Ahn Ji, Authorized Officer for Korean Intellectual Property Office, International Search Report and Written Opinion for PCT/US2012/021846, International Search Report completed May 25, 2012, 8 pages.
Na, Lee Da, Authorized Officer for Korean Intellectual Property Office, International Search Report and Written Opinion for PCT/US2012/020954, International Search Report completed Aug. 23, 2012, 10 pages.
Alpern, B., "The Jalapeno virtual machine," IBM Systems Journal, 2000, vol. 39, Issue 1, pp. 211-238.

* cited by examiner

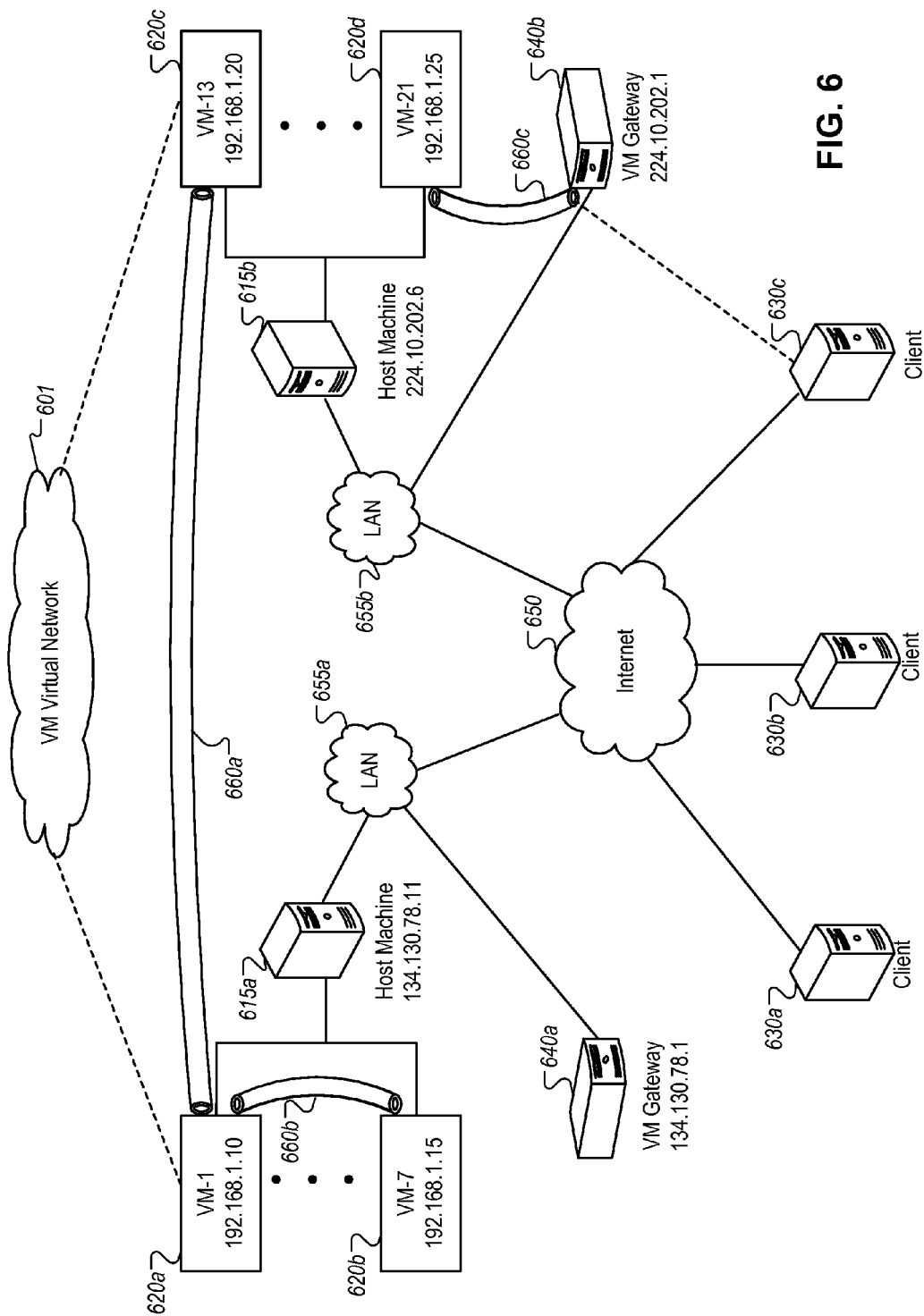

LOG STRUCTURED VOLUME ENCRYPTION FOR VIRTUAL MACHINES

BACKGROUND

This specification relates to secure data storage, and particularly to secure data storage for virtual machines.

Cloud computing is network-based computing in which typically large collections of servers housed in data centers or "server farms" provides computational resources and data storage as needed to remote end users. Some cloud computing services allow end users to run user-provided server software applications (e.g., e-commerce server applications, web servers, or file servers) in the cloud. Some other cloud computing services provide access to software applications such as word processors and other commonly used applications to end users who utilize the applications through web browsers or other client-side software. Users' electronic data files are usually stored in the server farm rather than on the users' personal computing devices.

SUMMARY

In general, one aspect of the subject matter described in this document can be embodied in methods implemented by one or more data processing apparatuses that include a method for data encryption. The method comprises receiving a first request from a first virtual machine to store data in a log structured volume. The method further comprises, based on the first request, obtaining the data and an access control list of one or more users authorized to access the data. The method further comprises obtaining a data key that has a data key identifier. The method further comprises encrypting, using the one or more data processing apparatuses, the data key and the access control list using a wrapping key to generate a wrapped blob. The method further comprises encrypting, using the one or more data processing apparatuses, the data using the data key to generate encrypted data. The method further comprises storing the wrapped blob and the encrypted data in the log structured volume. The method further comprises providing the data key identifier to one or more users on the access control list. The method further comprises receiving a second request from a second virtual machine to obtain a snapshot of the data. The method further comprises, based on the second request, obtaining an unwrapped blob containing the data key and the access control list. The method further comprises obtaining the data key and the access control list from the unwrapped blob. The method further comprises authenticating a user associated with the second request and authorizing the user against the access control list. The method further comprises, upon a determination that the user is authenticated and authorized, decrypting, using the one or more data processing apparatuses, the data using the data key. The method further comprises providing a snapshot of the data to the second virtual machine.

Implementations can include one or more of the following features. The method further comprises determining that a threshold condition associated with storage of the data on the log structured volume has occurred. The method further comprises obtaining a new data key identified by a new data key identifier, decrypting the data using the data key, encrypting the new data key and the access control list using the wrapping key to generate a new wrapped blob, encrypting the data using the new data key to generate encrypted data, storing the new wrapped blob and the encrypted data in the log structured volume, providing the new data key identifier to the one or more users on the access control list, and preventing subsequent use of the data key. The threshold condition includes an amount of data protected by the data key. The amount of data protected by the data key is a cumulative amount. The amount of data protected by the data key is a current amount. The threshold condition includes a time duration that the data key has been in use. The method further comprises auditing access of the data and determining that the data has been accessed by a user that is not on the access control list and that the data key has been compromised. The method further comprises obtaining a new data key identified by a new data key identifier, decrypting the data using the data key, encrypting the new data key and the access control list using the wrapping key to generate a new wrapped blob, encrypting the data using the new data key to generate encrypted data, storing the new wrapped blob and the encrypted data in the log structured volume, providing the new data key identifier to the one or more users on the access control list, and preventing subsequent use of the data key. Storing the encrypted data includes compacting the encrypted data.

In another aspect, a system can comprise one or more data processing apparatuses programmed to perform operations. The operations comprise receiving a first request from a first virtual machine to store data in a log structured volume. The operations further comprise, based on the first request, obtaining the data and an access control list of one or more users authorized to access the data. The operations further comprise obtaining a data key that has a data key identifier. The operations further comprise encrypting the data key and the access control list using a wrapping key to generate a wrapped blob. The operations further comprise encrypting the data using the data key to generate encrypted data. The operations further comprise storing the wrapped blob and the encrypted data in the log structured volume. The operations further comprise providing the data key identifier to one or more users on the access control list. The operations further comprise receiving a second request from a second virtual machine to obtain a snapshot of the data. The operations further comprise, based on the second request, obtaining an unwrapped blob containing the data key and the access control list. The operations further comprise obtaining the data key and the access control list from the unwrapped blob. The operations further comprise authenticating a user associated with the second request and authorizing the user against the access control list. The operations further comprise, upon a determination that the user is authenticated and authorized, decrypting the data using the data key. The operations further comprise providing a snapshot of the data to the second virtual machine.

Implementations can include one or more of the following features. The operations further comprise determining that a threshold condition associated with storage of the data on the log structured volume has occurred. The operations further comprise: obtaining a new data key identified by a new data key identifier, decrypting the data using the data key, encrypting the new data key and the access control list using the wrapping key to generate a new wrapped blob, encrypting the data using the new data key to generate encrypted data, storing the new wrapped blob and the encrypted data in the log structured volume, providing the new data key identifier to the one or more users on the access control list, and preventing subsequent use of the data key. The threshold condition includes an amount of data protected by the data key. The amount of data protected by the data key is a cumulative amount. The amount of data protected by the data key is a current amount. The threshold condition includes a time duration that the data key has been in use. The operations further comprise auditing access of the data and determining that the data has been accessed by a user that is not on the access control list and that the data key has been compromised. The operations further comprise obtaining a new data key identified by a new data key identifier, decrypting the data using the data key, encrypting the new data key and the access control list using the wrapping key to generate a new wrapped blob, encrypting the data using the new data key to generate encrypted data, storing the new wrapped blob and the encrypted data in the log structured volume, providing the new data key identifier to the one or more users on the access control list, and subsequent use of the data key. Storing the encrypted data includes compacting the encrypted data.

In another aspect, a storage medium has instructions stored thereon that, when executed, cause data processing apparatus to perform operations. The operations comprise receiving a first request from a first virtual machine to store data in a log structured volume and based on the first request, obtaining the data and an access control list of one or more users authorized to access the data. The operations further comprise obtaining a data key that has a data key identifier. The operations further comprise encrypting the data key and the access control list using a wrapping key to generate a wrapped blob. The operations further comprise encrypting the data using the data key to generate encrypted data. The operations further comprise storing the wrapped blob and the encrypted data in the log structured volume. The operations further comprise providing the data key identifier to one or more users on the access control list. The operations further comprise receiving a second request from a second virtual machine to obtain a snapshot of the data and, based on the second request, obtaining an unwrapped blob containing the data key and the access control list. The operations further comprise obtaining the data key and the access control list from the unwrapped blob. The operations further comprise authenticating a user associated with the second request and authorizing the user against the access control list and, upon a determination that the user is authenticated and authorized, decrypting the data using the data key. The operations further comprise providing a snapshot of the data to the second virtual machine.

Implementations can include one or more of the following features. The operations further comprise determining that a threshold condition associated with storage of the data on the log structured volume has occurred. The operations further comprise obtaining a new data key identified by a new data key identifier, decrypting the data using the data key, encrypting the new data key and the access control list using the wrapping key to generate a new wrapped blob, encrypting the data using the new data key to generate encrypted data, storing the new wrapped blob and the encrypted data in the log structured volume, providing the new data key identifier to the one or more users on the access control list, and preventing subsequent use of the data key. The threshold condition includes an amount of data protected by the data key. The amount of data protected by the data key is a cumulative amount. The amount of data protected by the data key is a current amount. The threshold condition includes a time duration that the data key has been in use. The operations further comprise auditing access of the data and determining that the data has been accessed by a user that is not on the access control list and that the data key has been compromised. The operations further comprise obtaining a new data key identified by a new data key identifier, decrypting the data using the data key, encrypting the new data key and the access control list using the wrapping key to generate a new wrapped blob, encrypting the data using the new data key to generate encrypted data, storing the new wrapped blob and the encrypted data in the log structured volume, providing the new data key identifier to the one or more users on the access control list, and preventing subsequent use of the data key. Storing the encrypted data includes compacting the encrypted data.

Particular embodiments of the subject matter described in this document can be implemented so as to realize one or more of the following advantages. In some implementations, base volume keys can be used to encrypt persistent data on a base-volume basis. Each set of snapshots associated with the persistent data, in some implementations, can have a snapshot group key associated with it. These types of keys, including base volume keys and snapshot group keys (e.g., symmetric keys) used to access content in persistent disks, can be referred to as persistent disk keys, or herein, data keys. In some implementations, access to any data key can be predicated upon two authentications: the first authentication for cloud-cluster access, and the second authentication for user-level access, e.g., for a user or principal identified in an access control list (ACL) associated with the data and the data key. In some implementations, these authentication features can be in effect by default for all disks, and the features cannot be disabled, e.g., by a user who may attempt unauthorized or unaudited access to data.

In some implementations, ephemeral data (e.g., data which is not guaranteed to be preserved between reboots) can be protected using a single randomly generated key that is used to protect data on all block devices for any given VM host. For example, data keys can be needed for ephemeral data used for the VM state stored during save and restore operations. The keys may exist only in memory and may not be written to disk (e.g., during a swap). In some implementations, kernel-level processes can wipe the memory containing key material. For example, whenever a key is no longer in use or no longer needed (e.g., at VM process shutdown), kernel-level processes can wipe clean any key information that is in process memory at the time of process termination. In some implementations, these features can be in effect by default and cannot be disabled.

In some implementations, encryption can occur for memory contents written to disk during a VM save state operation. For example, any key material used to protect encrypted data written to disk can be wrapped by a key management system (e.g., by a key store component). The key management system can further manage key wrap and unwrap operations when performing operations that involve storing VM state information.

In some implementations, unique sets of data keys can be generated for each set of images managed on the log structured volume. For example, each key can be wrapped with an access control list (ACL) for each user or principal having access to the data, and the data keys can be released only to those users. In some implementations, each snapshot of data protected by encryption can include a block (e.g., the first block) that contains metadata that includes a wrapped data key wrapper and the associated ACLs. Some implementations can further employ a "master key" that processes of the cloud-cluster authorization services use to access encrypted data.

In some implementations, the key management system can handle key sharing. For example, a single data key can be used concurrently by the VMs associated with several users identified by the ACL as having access to the protected data. In some implementations, the key management system can perform other operations such as key rotation, retirement and revocation, processes for which are described below with reference to FIGS. 5A-5C.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 shows an example of a networking architecture for a distributed system configured to run virtual machines.

Like reference numbers and designations in the various drawings indicate like elements.

DETAILED DESCRIPTION

This document describes systems, methods and apparatus for encrypting data used in a virtual machine (VM) environment, e.g., in "cloud-based" or "cloud cluster" computing, where multiple VMs exist. For example, encryption techniques described herein can be used for encrypting persistent data (e.g., data that is stored in the cloud), ephemeral data (e.g., snapshots of the persistent data used in VMs), and data that exists in memory. For example, persistent storage can include storage that persists beyond the life of a VM, while ephemeral storage can include storage that disappears when the VM terminates. In some implementations, the encryption techniques described herein can be used for log-structured volume (LSV) file systems which are file systems designed for high write throughput and in which updates to data and metadata are written sequentially to a continuous stream (e.g., a "log").

In some implementations, other storage systems can be used instead of, or in addition to, LSV systems. For example, storage systems can be used that treat a back-end storage system as a black box. Other storage systems are possible.

In further implementations, requests can be received from sources other than virtual machines. For example, implementations can provide a secure barrier between user applications and key/data management systems, e.g., a system where storage is attached to a client via a network, e.g., using Internet Small Computer Systems Interface (iSCSI) protocols or other means, like tradition storage area networks (SANs). In this example, client and server components can be separated by a network barrier, but the use of virtual machines is not required.

Figure 1:
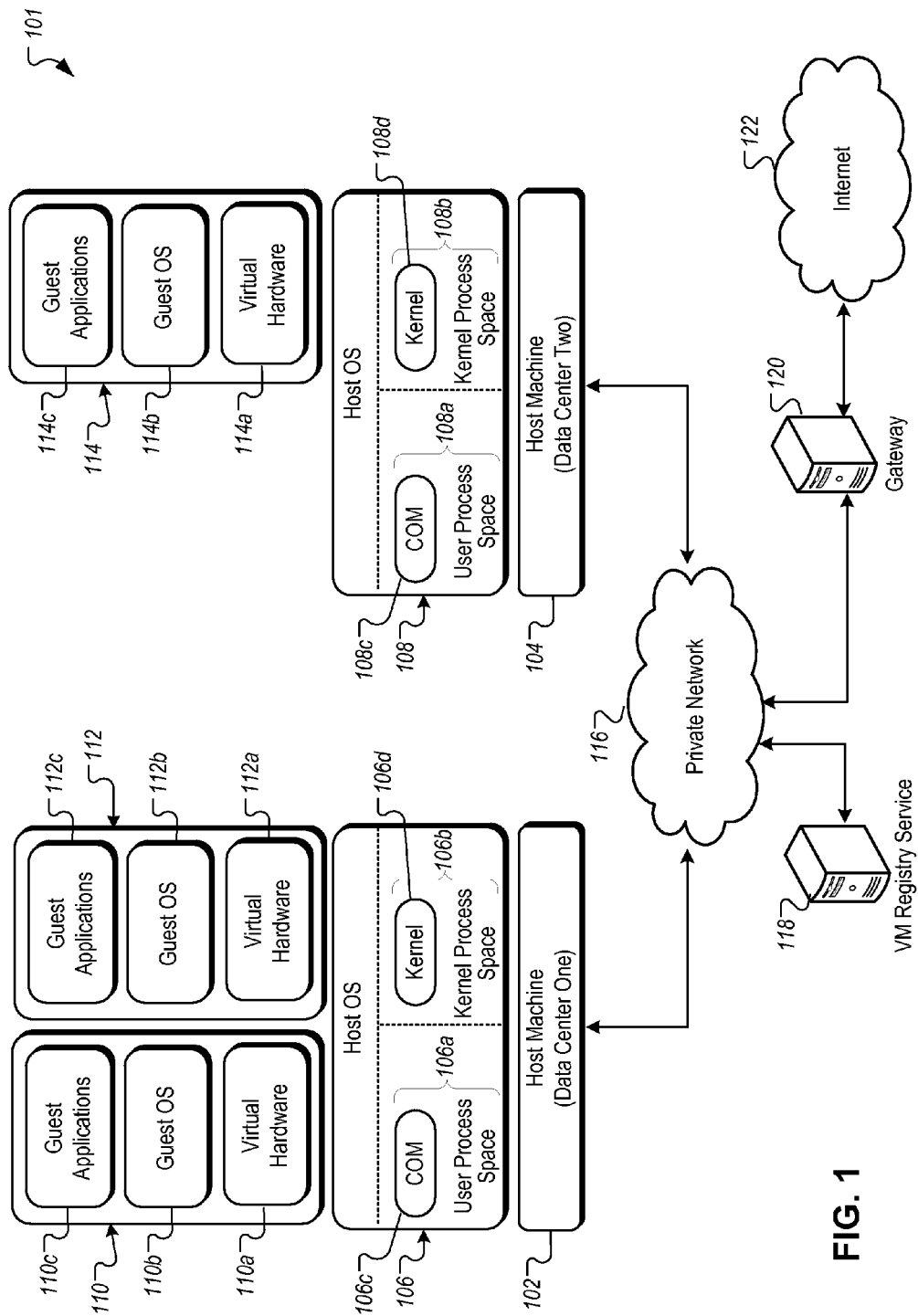
FIG. 1 shows an example of a distributed system that includes multiple virtual machine instances.

FIG. 1 shows an example of a distributed system 101 that includes multiple virtual machine instances. A distributed system 101 can run virtual machines (VMs) 110, 112, 114, on host machines 102, 104. Elements of the distributed system 101 can reside in the same or in different physical locations. For example, a first host machine 102 can reside in a first data center, while a second host machine 104 can reside in a second data center. In some implementations, these data centers can be located in different states, countries, or both.

In some implementations, the distributed system 101 can provide a virtual network to the virtual machines 110, 112, 114 for Internet Protocol (IP) based communications. The VMs 110, 112, 114 are assigned network addresses (e.g., an IPv4 address or IPv6 address) that are routable on the virtual network. In some implementations, the virtual network includes a private subnet (e.g., 192.168.0.0/16, 10.0.0.0/8).

Host machines 102, 104 included in a distributed system 101 can contain one or more data processing apparatuses such as rack-mounted servers or other computing devices. Host machines 102, 104 can have different capabilities and computer architectures, and can be located in the same or in different geographic locations. Host machines 102, 104 can communicate with each other through a network such as a private network 116 (e.g., dedicated or leased optical fiber or copper wires). Host machines 102, 104 can also communicate with devices on external networks, such as the Internet 122, through one or more gateways 120 which are data processing apparatus responsible for routing data communication traffic between the private network 116 and the Internet 122. Other types of external networks are possible.

The private network 116 can include one or more wired (e.g., Ethernet) or wireless (e.g., WI-FI) networks, for example. In some implementations, the private network 116 includes physical communication assets such as optical fiber or copper wire that connect two data centers. In some implementations, the private network 116 is implemented over an external network such as the Internet 122. In some implementations, data centers have respective local area networks (LANs) that are aggregated together to form a private network 116. IP traffic between data centers can be routed, for example, by using Multiprotocol Label Switching (MPLS). Other types of routing are possible.

Each host machine 102, 104 executes a host operating system (e.g., host operating systems 106 and 108). Each host operating system 106, 108 manages host machine resources. In this example, host operating systems 106, 108 run software that virtualizes the underlying host machine hardware and manages concurrent execution of one or more VMs. For example, the host operating system 106 manages two VMs (VM 110 and VM 112), while a different host operating system 108 manages a single VM 114. A host machine can, in general, manage larger quantities of virtual machines; however, the quantity may be limited based on physical resources of the host machine.

The VMs 110, 112, 114 use a simulated version of an underlying host machine hardware, which can be referred to as virtual hardware (e.g., virtual hardware 110a, 112a and 114a). Software that is executed by the virtual hardware can be referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system and is allocated virtual disk blocks from one or more virtual disk drives for use by the guest software executing on the VM. For example, host operating system 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persistent across VM restarts. In some implementations, virtual disk blocks are allocated on physical disk drives coupled to host machines. VMs can be allocated network addresses through which their respective processes can communicate with other processes via a virtual network. For example, guest software executing on VM 110 can communicate with guest software executing on VM 112 or VM 114 via the virtual network using the allocated network addresses.

A VM's guest software can include a guest operating system (e.g., guest operating systems 110*b*, 112*b* and 114*b*) which is software that controls the execution of respective guest software applications (e.g., guest applications 110*c*, 112*c* and 114*c*), within the VM and provides services to those applications. For example, a guest operating system can be an operating system such as a variant of the UNIX operating system. Other operating systems are possible. Each VM can execute the same guest operating system or different guest operating systems. Booting a VM can include using a virtual boot disk to load a kernel image associated with a guest operating system into memory. A guest operating system's access to resources such as networks and virtual disk storage is controlled by the underlying host operating system.

By way of illustration, and with reference to virtual machine 110, when the guest application 110*c* or guest operating system 110*b* attempts to perform an input/output operation on a virtual disk, initiate network communication, or perform a privileged operation, for example, the virtual hardware 110*a* is interrupted so that the host operating system 106 can perform the action on behalf of the virtual machine 110. The host operating system 106 can perform these actions with a process that executes in kernel process space 106*b*, user process space 106*a*, or both.

The kernel process space 106*b* is virtual memory reserved for the host operating system 106's kernel 106*d* which can include kernel extensions and device drivers, for instance. The kernel process space has elevated privileges (sometimes referred to as "supervisor mode"); that is, the kernel 106*d* can perform certain privileged operations that are off limits to processes running in the user process space 106*a*. Examples of privileged operations include access to different address spaces, access to special functional processor units in the host machine such as memory management units, and so on. The user process space 106*a* is a separate portion of virtual memory reserved for user mode processes. User mode processes cannot perform privileged operations directly.

In various implementations, a portion of VM network communication functionality is implemented in a communication process (e.g., communication process 106*c*). In some implementations, the communication process executes in the user process space (e.g., user process space 106*a*) of a host operating system (e.g., host operating system 106). In other implementations, the communication process can execute in the kernel process space (e.g., kernel process space 106*d*) of the host operating system. There can be a single communication process for all VMs executing on a host machine or multiple communication processes, one for each VM executing on a host machine. In yet further implementations, some portion of the communication process executes in the user process space and another portion executes in the kernel process space. In some implementations, the communication process can use a hardware level encapsulation mechanism.

A communication process 106*c*, 108*c* can communicate with a VM registry service 118 to establish a virtual network pair (VNP) between two VMs. In a virtual network, a VNP can be used to route traffic between two endpoints using one or more virtual connections or links Network traffic associated with the VNP can be carried via a local loop (e.g., if both VMs are on the same host machine) or carried via one or more networks, such as a private network 116, Internet 122, or a combination thereof. For example, a VNP between virtual machine 110 and virtual machine 114 can be used to route packets sent between VNP endpoints managed respectively by first and second communication processes 106*c*, 108*c* over the private network 116. In some implementations, a server such as a VM registry server implements the functionality of the VM registry service. The VM registry service 118 can manage assignments of network addresses (e.g., IP addresses) to VMs, and maintain mappings between VM network addresses on a virtual network and the respective network addresses of the host machines running the VMs.

Figure 2A:
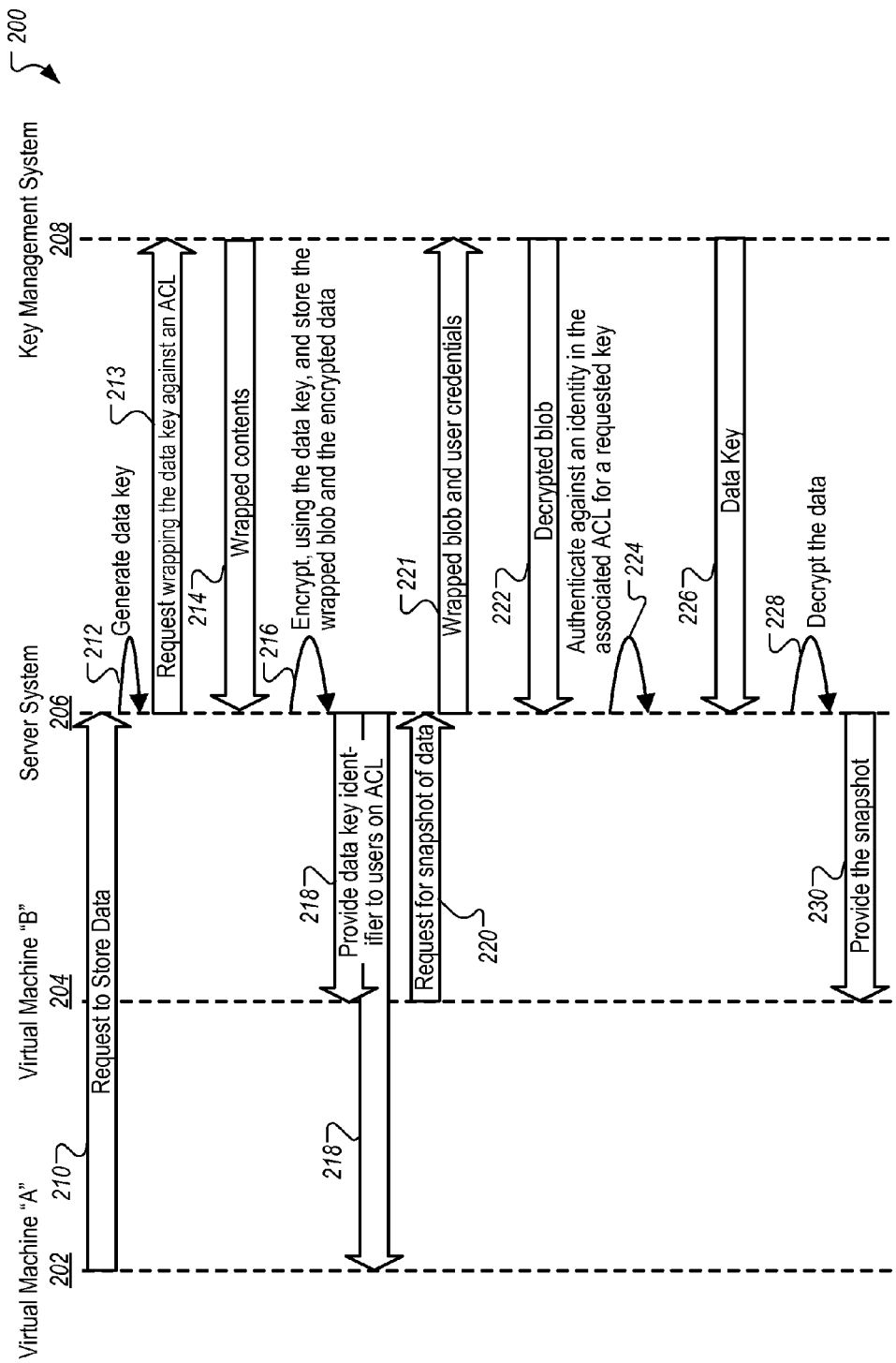
FIG. 2A illustrates an example sequence of operations for data encryption of data created and accessed by virtual machines.

FIG. 2A illustrates an example sequence of operations in a system 200 for data encryption of data created and accessed by VMs. In some implementations, the system 200 includes multiple VMs, e.g., VM A 202 and VM B 204, and a server system 206 that provides access to the data. In some implementations, the server system 206 is configured to run VMs that communicate on a virtual network. For example, the VMs are assigned network addresses on the virtual network. In some implementations, the server system 206 uses separate tunnels to effect delivery of packets on the virtual network to the respective virtual machines. In some implementations, the environment 200 includes a key management system 208 that assigns keys used in encryption/decryption (e.g., using random key generation techniques), associates data key identifiers with the keys, and wraps keys in wrappers. The terms "wrap" and "wrapped" as used herein encompass their plain and ordinary meaning, including, but not limited to, the act of encrypting a key. Further, when more than just the key is encrypted, that entire structure is often called a "wrapped blob." Encrypted user data can be "wrapped" by associating a metadata containing details of encryption used for encrypting specific blocks of data (e.g., encryption algorithm, encryption key index, authentication tags, etc.). For the sake of clarity and without loss of generality, the term "data wrapper" will be used furthermore to denote such combination of encrypted data and encryption metadata which may or may be not stored together.

In some implementations, the virtual machine manager for a virtual machine can use libraries to interact with the LSV subsystem, e.g., that execute in a third ring (or unprivileged application domain) of the host. For example, the code can act to provide the role of the server system 206.

In general, a data key identifier uniquely identifies a key. Data key identifiers can be generated in various ways. In some implementations, a method of the key management system 208 can generate a key identifier using a hash of the key material and based on the key type. In some implementations, other ways of generating a key identifier can be used.

In some implementations, a first request 210 is received by the server system 206 from a first VM (e.g., VM A 202) to store data in a log structured volume. Based on the request, the server system 206 generates 212 a data key and requests 213 that the data key be wrapped against an access control list (ACL) of one or more users authorized to access the data. For example, the ACL can be provided by a user authorization system (e.g., a single sign-on system). In some implementations, the key management system 208 provides 214 the server system 206 with a wrapped blob that includes the wrapped ley. The server system 206 uses the data key to encrypt the data 216, and stores the encrypted data and the wrapped blob in the log structured volume. The server system 206 provides 218 the data key identifier to one or more users on the access control list, e.g., users associated with VM A 202 and VM B 204.

The server system 206 receives a second request 220 from a second virtual machine (e.g., VM B 204) to obtain a snapshot of the data. Based on the second request, the server system 206 sends 221 the wrapped blob to the key management system 208), along with credentials. The key management system 208 uses its wrapping key, e.g., a master key, to decrypt the blob, retrieves the keys and their associated ACLs, and provides 222 the unwrapped blob to the server system 206. If the credentials authenticate 224 against an identity in the associated ACL for the requested key, then the key management system 208 returns that key 226 to the server system 206 which decrypts the data 228 using the data key and provides a snapshot 230 of the data to the second virtual machine (e.g., VM B 204).

Figure 2B:
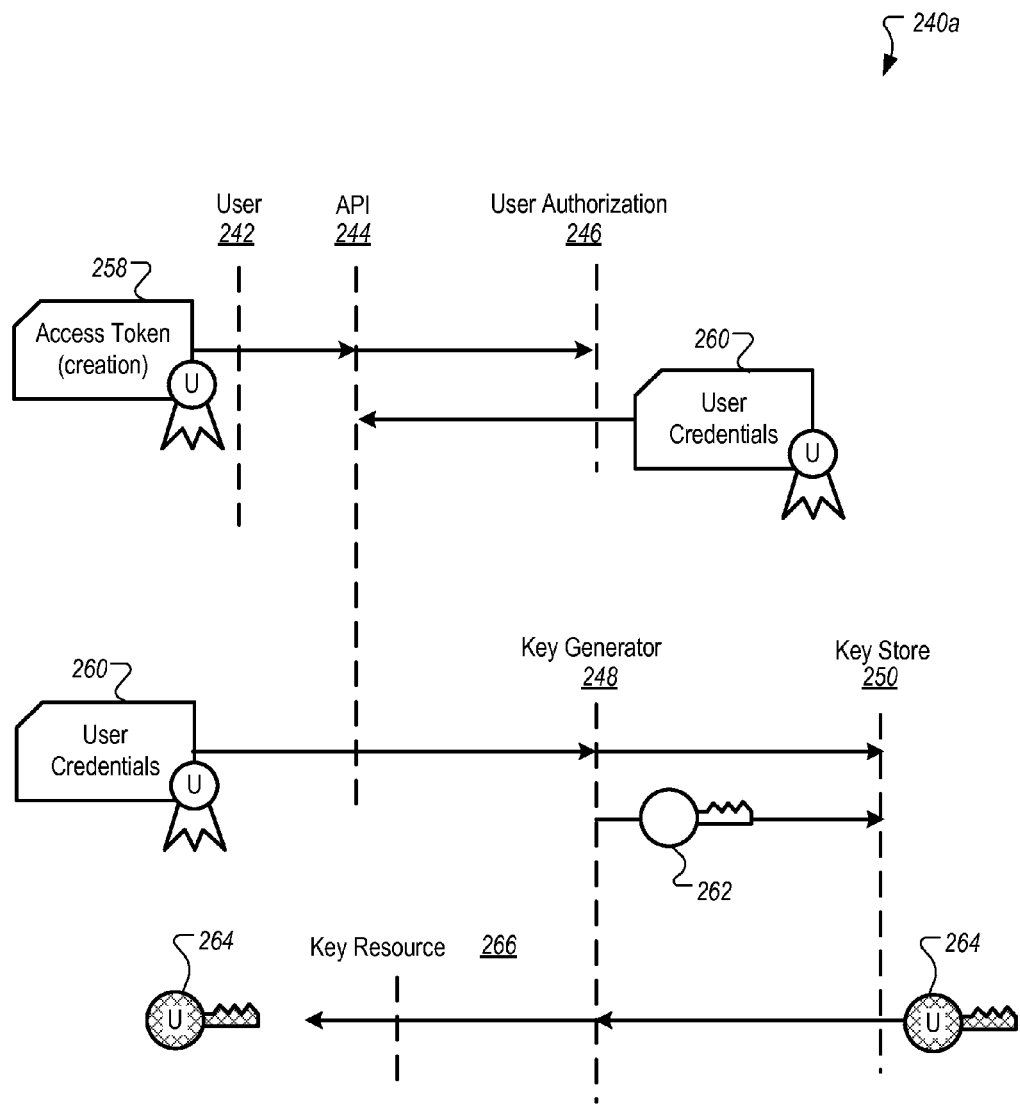
FIGS. 2B, 2C, and 3 are diagrams that illustrate example sequences of operations used for key management techniques during encryption/decryption.
Figure 2C:
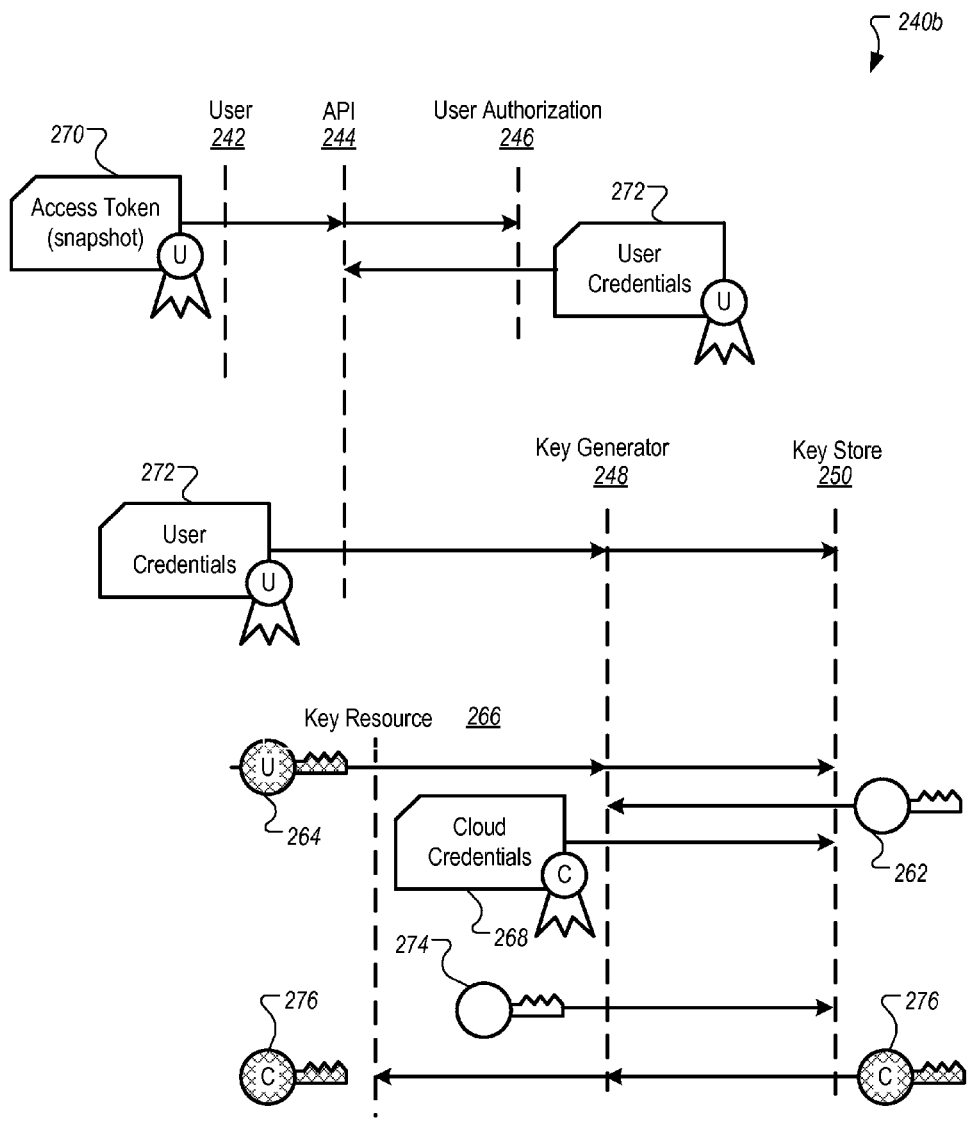
Figure 3:
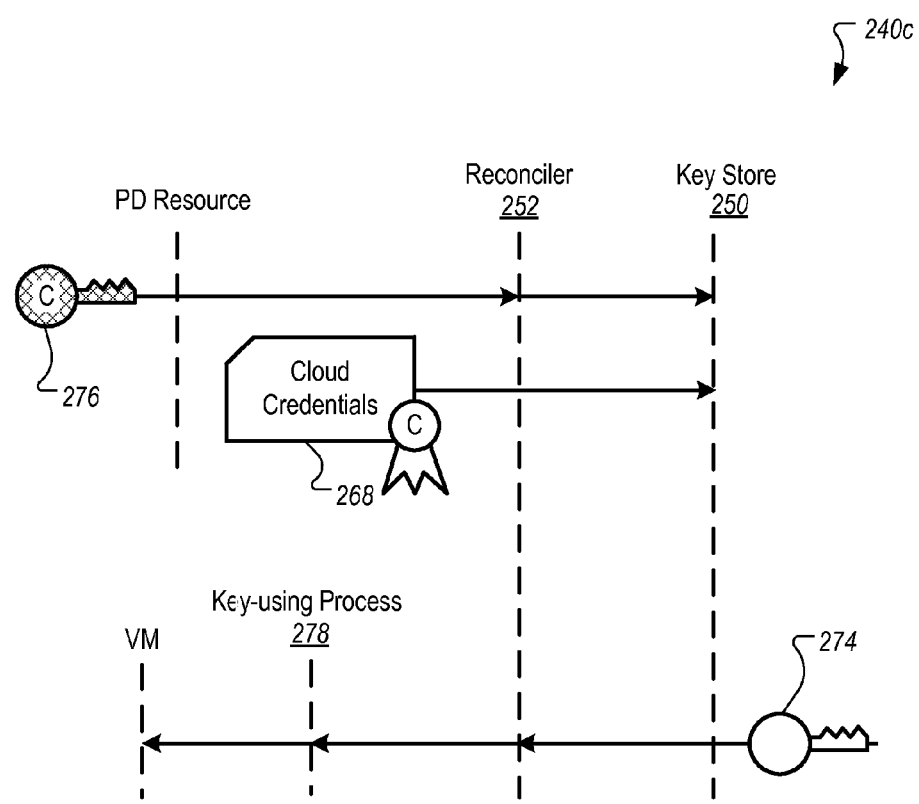

FIGS. 2B, 2C, and 3 are diagrams that illustrate example sequences of operations 240a-240c, respectively, used for key management techniques during encryption/decryption. The techniques can be used, for example, using symmetric keys that are used to directly protect disk and VM save state content. In some implementations, the data keys can be managed using wrap and unwrap functions of the key management system, e.g., using data keys generated by and maintained in a the key store. In some implementations, data keys are referenced by a hash of the key material that is generated using a method based on the key type.

The operations 240a can be performed, for example, in an environment that includes a user 242, an application programming interface (API) 244, and a user authorization 246 used by the user 242 to sign onto the VM, e.g., using the API 244. In some implementations, a key-generator 248 generates and wraps data keys that are stored in a key store 250.

Referring to the sequence 240a shown in FIG. 2B, upon the creation of data (e.g., persistent data) by the user 242, the API 244 receives an access token 258, e.g., from a remote device. The data can be included, for example, with a request from a VM to store the data in a log structured volume. The access token 258 is forwarded to the user authorization 246, which generates user credentials 260 that are passed back to the API 244. The user credentials include, for example, an access control list (ACL) that identifies one or more users authorized to access the data. The key-generator 248 receives the user credentials 260 and generates a user key 262, which is used to encrypt the data before the data is stored in the log structured volume. The key 262 is then wrapped to produce a wrapped key 264. A key resource 266 is produced that includes a data key identifier and a data key wrapper (e.g., the wrapped key 264). The data key wrapper contains a data key identified by the data key identifier. The data key wrapper further contains the ACL that identifies the user(s) authorized to access the data.

Referring to FIG. 2C, the sequence 240b includes unwrapping with user key for accessing the protected data within the cloud. For example, upon creation of a VM (e.g., by the same or a different user), the API 244 receives an access token 270, e.g., from a remote device. In this example, the access token 270 is associated with a request by the user 242 to access a snapshot of the data. The access token 270 is forwarded to the user authorization 246, which provides user credentials 272. The user credentials 272 and key resource 266 (including the wrapped key 264) are passed to the key generator 248. Upon verification that the user is authorized to access the data, the wrapped key 264 is un-wrapped (e.g., at the key store 250), producing the user key 262. Cloud-based credentials 268 and a cloud-based key 274 are provided to the key store 250, which creates a wrapped key 276.

Referring to FIG. 3, the sequence 240c includes using the cloud-based wrapped key 272 to gain access to the protected data in the cloud. For example, the wrapped key 272 and cloud-based credentials 268 are provided to the reconciler 252. If the user 242 requesting access to the protected data is authorized to access the data, then the wrapped key 276 is un-wrapped (e.g., by the key-store 250) to provide the unwrapped key 274. In some implementations, a key-using process 278 uses the un-wrapped key 274 to decrypt the data for access by the user 242 on the VM.

In some implementations, the reconciler 252 includes processes that maintain long-lived authorization access tokens that correspond to a user's access to data on the VM. The reconciler 252 can request access tokens as necessary to un-wrap keys. For example, the reconciler 252 can use its authorization services role credentials to have the key store 250 unwrap a data key that is wrapped against the cloud-cluster role.

In some implementations, key store 250 uses the authorization services credentials to gate access to master keys. For example, master keys can be used to decrypt a wrapped key to locally reveal the ACLs associated with the keys. Key store 250 can then verify that the identity corresponding with an access token (e.g., access token 270) has an entry in the ACL to allow access to its corresponding key. At that point, the key store 250 can return the key to a replicator process, which will associate the key with the storage devices so long as the VM is active. The replicator can continue to use the same access token as it requires access to new keys in the course accessing the persistent disk. When the access token expires, the replicator can request a new access token. Any processes holding keys or tokens can then wipe the containing memory as soon as the keys or tokens are no longer required.

In some implementations, the log structured volume (LSV) determines whether to decrypt the data on reads (e.g., if it has already been decrypted) and always encrypts data on writes. In some implementations, the LSV maintains, within the block of metadata, information about the encryption state of each block. LSV management tools further handle ACL or other cryptographic property changes on snapshot boundaries. For example, when snapshot cryptographic properties change, the changes are automatically updated in the new snapshot. In some implementations, the cryptographic metadata associated with any given snapshot resides in a snapshot metadata segment that is stored within the data block. For snapshots that involve modifications to a data key (e.g., for key rotation, retirement, etc.), key management tools generate a new wrapped key. In some implementations, the wrapped key set from the previous snapshot is copied to the metadata for the current snapshot.

Some implementations pass secret key material using secure calls and/or transactions that are not logged. For example, using secure calls can prevent secret key material from appearing in logs, monitoring tools, or other resources associated with standard calls and transactions. Further, for processes that associate and maintain key information (e.g., key state buffers) with disks, the key information does not include secret key material but rather only provides metadata about the key, including the key type and the key identifier.

In some implementations, key state objects that include secret key material are maintained in an internally-managed cache. For example, when a new VM instance is launched, all of the secret key material is first passed, as a VM specification, in a cache using a secure call. A system process then adds key state objects, scrubbed of their secret key material, to the disks that constitute the VM. When the system process sends the VM specification as part of a VM creation, the previously-received secret key material is injected into the VM specification using the key identifiers to match up the key materials.

Figure 4:
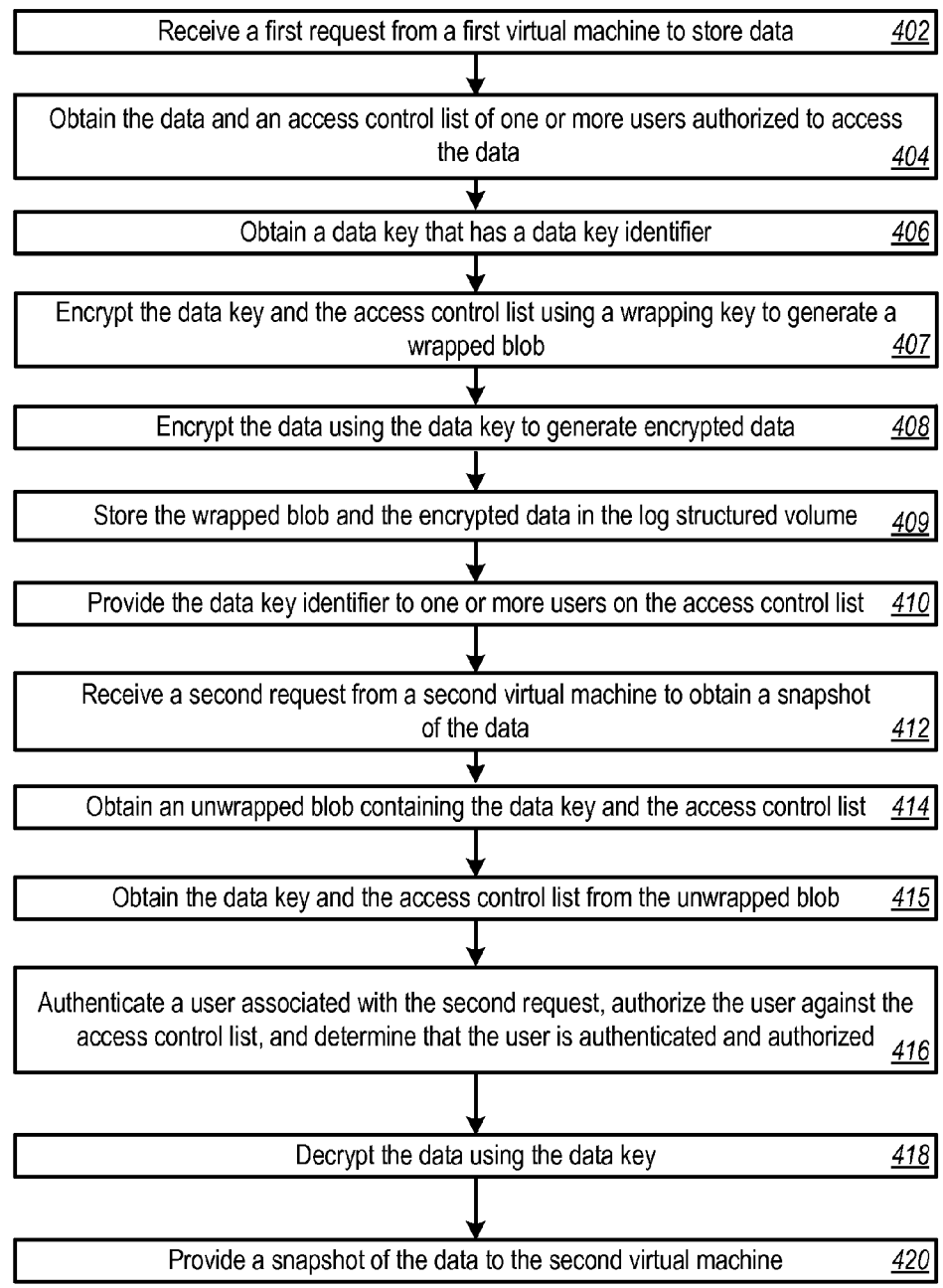
FIG. 4 is a flow diagram showing an example of a technique for packet de-encapsulation.

FIG. 4 is a flow diagram showing an example process 400 for encrypting data for virtual machines. For example, the process 400 can be performed by the server system 206 described with reference to FIG. 2A.

At 402, a first request is received from a first virtual machine to store data in a log structured volume. As an example, the server system 206 can receive the request 210 from a first VM (e.g., VM A 202). The request can be to store data, such as a newly-created data file (e.g., an accounting spreadsheet) that the user (e.g., User A) created on the VM A 202.

At 404, based on the request, the data and an access control list (ACL) of one or more users authorized to access the data are obtained. For example, the server system 206 can receive the data to be stored (e.g., the accounting spreadsheet) from the user device that is accessing the VM. At the same time, the server system 206 can receive the ACL that identifies the users who are authorized to access the data (e.g., Users A, B and C)

At 406, a data key is obtained that is identified by a data key identifier. For example, the key management system 208 can generate a data key (e.g., an encryption key) that is identified by a data key identifier assigned by the key management system 208.

At 407, the data key and the access control list are encrypted using a wrapping key to generate a wrapped blob. At 408, the data is encrypted using the data key to generate encrypted data. At 409, the wrapped blob and the encrypted data are stored in the log structured volume. As an example, the server system 206 can store each on the LSV.

At 410, the data key identifier is provided to one or more users on the access control list. For example, the server system 206 can provide the data key provided to all users who are authorized to access the data, e.g., all users on the ACL associated with the data.

At 412, a second request is received from a second virtual machine to obtain a snapshot of the data. As an example, the same user (e.g., User A) or a different user (e.g., User B) can send a request to obtain a copy of the accounting spreadsheet. The request can include the data key identifier and an identification of the user making the request.

At 414, based on the second request, an unwrapped blob containing the data key and the access control list are obtained. At 415, the data key and the access control list are obtained from the unwrapped blob. For example, using the data key identifier, the server system 206 can request and receive the data key wrapper from the key management system 208.

At 416, a user associated with the second request is authenticated, the user is authorized against the access control list, and it is determined whether the user is authenticated and authorized. As an example, the server system 206 can check the user credentials (e.g., user identification) associated with the request against the ACL to verify that the user (e.g., User B) is authorized to access the accounting spreadsheet.

At 418, upon a determination that the user is authenticated and authorized, the data is decrypted using the data key. For example, if User B is identified as being on the ACL, then the server system 206 can use the data key to decrypt the accounting spreadsheet.

At 420, a snapshot of the data is provided to the second virtual machine. As an example, the server system 206 can provide the accounting spreadsheet to User B for use on User B's VM.

Encryption and decryption that are performed by the process 400 can occur on an individual block basis, in addition to the encryption/decryption of key material. In some implementations, encryption/decryption can be implemented using a multi-threaded engine that cryptographically transforms chunks of data in parallel.

In some implementations, a fixed pool of threads can be used for parallel block encryption and decryption. For example, a default number of threads can be equal to the number of detected CPUs on the host (e.g., the server system 206). In some implementations, I/O threads can use fixed segments of memory as shadow buffers. Then, when it comes time to cryptographically transform the data, the segments can be divided into chunks for individual threads in the cryptographic transform thread pool. In some implementations, the default chunk size can be 512 KB or some other configurable size.

In some implementations, bitmaps can be used to track encryption of disks on a delta disk basis. For example, the blocks can include unencrypted blocks that do not contain any data (sparse) or blocks from an unencrypted base image. When the blocks are written and encrypted, the bitmap can be updated. The bitmap mechanism can be used, for example, for temporary images only, so that delta raw disk components of delta disks are encrypted while read-only base raw disk components of delta disks are not. In some implementations, opening an unencrypted raw disk base image for read/write with encryption enabled can result in corrupting the base image for subsequent opens for other VMs.

Figure 5A:
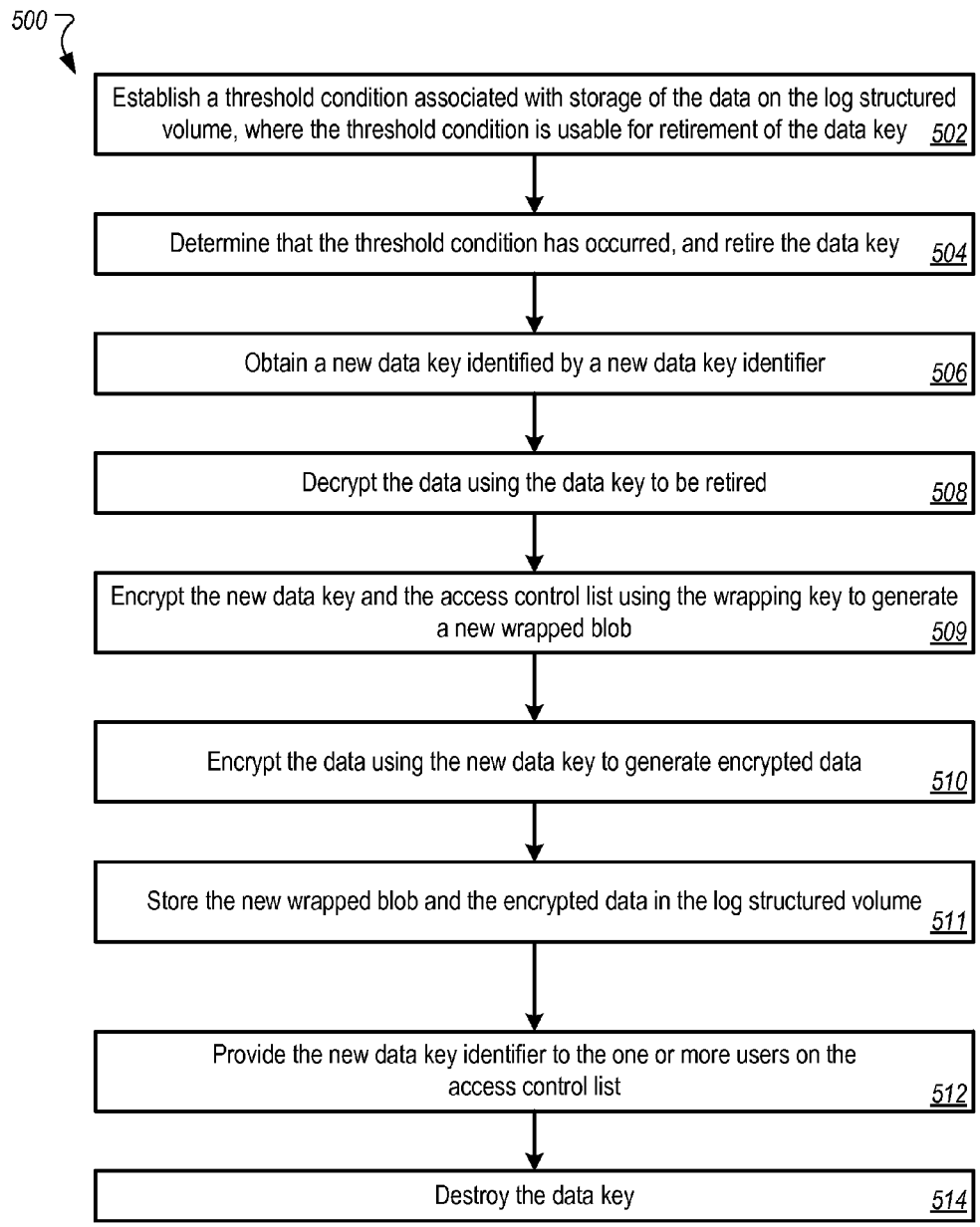
FIG. 5A is a flow diagram showing an example key rotation process for data keys used on virtual machines.

FIG. 5A is a flow diagram showing an example key rotation process 500 for data keys used on virtual machines. For example, the process 500 can be used to rotate data keys on a scheduled basis, e.g., every seven days or some other period of time. In some implementations, the process 500 can be used to roll cloud-cluster master keys, making the previous key an "active" key and the new key the "primary" key. Whenever a data key is unwrapped using an active master key version, the primary master key version can also be rewrapped, replacing the wrapped active key with the new wrapped primary key.

At 502, a threshold condition is established that is associated with storage of the data on the log structured volume, where the threshold condition is usable for rotation of the data key. In some implementations, the threshold condition includes an amount of data protected by the data key, such as a number of blocks of data, a number of files, or some other measure of the amount of data protected by the data key at the current time. In some implementations, the amount of data protected by the key is a cumulative amount, such as the total amount of data protected over time using the same data key. In some implementations, the threshold condition includes a time duration that the data key has been in use. For example, maximum time durations for using a data key can be set to any number of hours, days, weeks, etc.

At 504, a determination is made that the threshold condition has occurred and the time has arrived to rotate the data key, as described in the following steps. At 506, a new data key identified by a new data key identifier is obtained. In some implementations, the new data key can be received from the key management system 208.

At 508, the data is decrypted using the data key, i.e., the data key to be retired. This is the last use of the data key before its retirement.

At 509, the new data key and the access control list are encrypted using the wrapping key to generate a new wrapped blob. At 510, the data is encrypted using the new data key to generate encrypted data. At 511, the new wrapped blob and the encrypted data are stored in the log structured volume. At 512, the new data key identifier is provided to the one or more users on the access control list.

At 514, the to-be-retired data key is destroyed. In some implementations, destruction of the data key occurs by over-writing the data key's storage location with arbitrary non-key data.

Figure 5B:
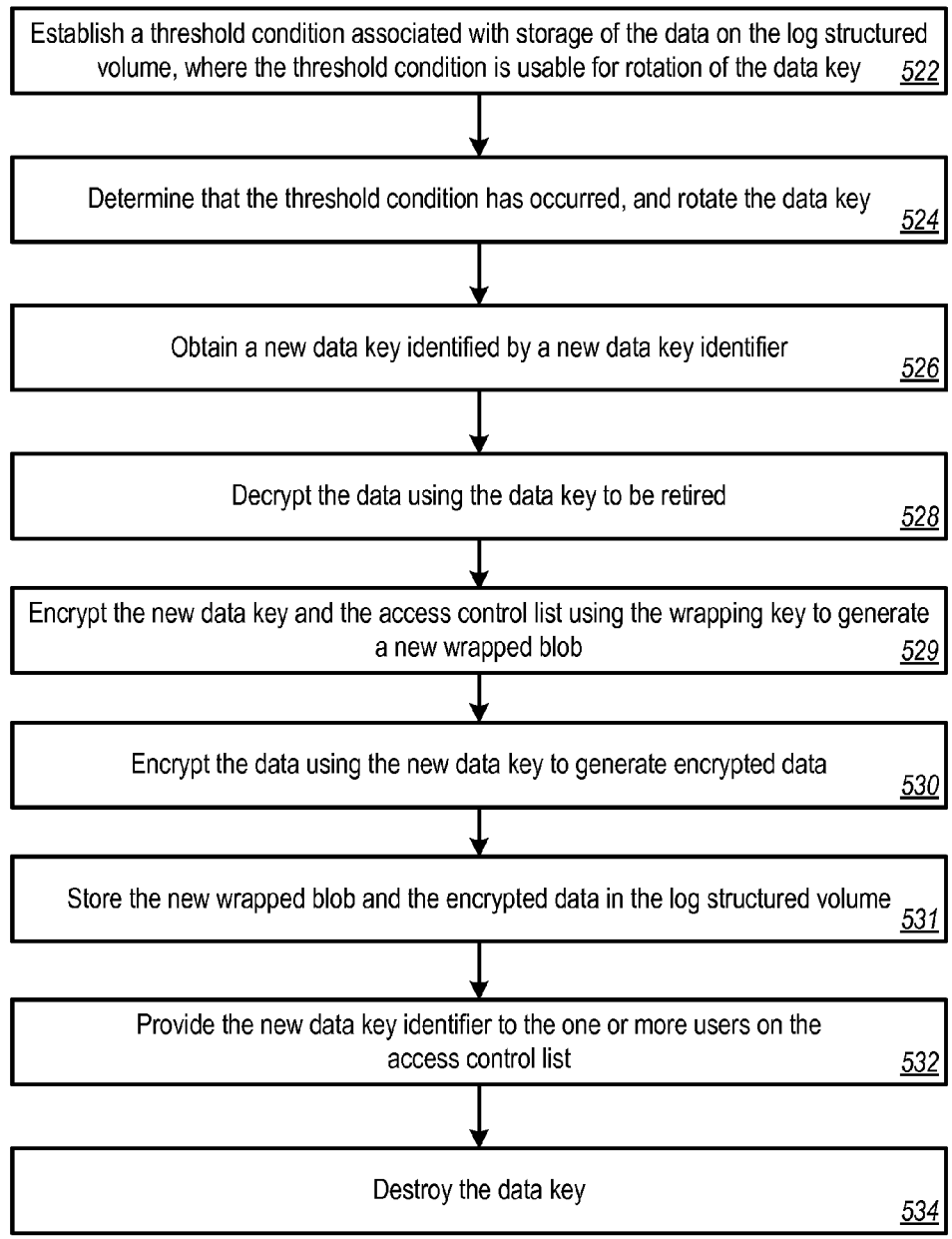
FIG. 5B is a flow diagram showing an example key retirement process for data keys used on virtual machines.

FIG. 5B is a flow diagram showing an example key retirement process 520 for data keys used on virtual machines. In some implementations, a directory is maintained for all wrapped keys, including information regarding which master key version was used for wrapping the keys. Some implementations further maintain a directory of all active data keys. For example, the directory includes references to the wrapped keys from which they were obtained and to the VM instances in which they are currently being held. Some implementations include timestamps associated with each key that indicate when each key was created. In some implementations, the timestamps and/or other information can be used to trigger the retirement of data keys. In some implementations, retirement occurs at 120 days, meaning that every existing wrapped key is rewrapped against the current primary master key no later than 120 days past the point that the wrapped key was generated. In some implementations, alarms are set (e.g., 120 days from the key creation date) by which triggering events occur to indicate the time for key retirement. Once all wrapped keys that were protected by an active master key have been rewrapped, the master key retirement process is completed by destroying the active master key. Example steps for retirement follow.

At 522, a threshold condition is established that is associated with storage of the data on the log structured volume, where the threshold condition is usable for retirement of the data key. In some implementations, the threshold condition includes a time duration that the data key has been in use, e.g., to retire data keys that reach 120 days old.

At 524, a determination that the threshold condition has occurred and retirement of the data key is initiated. The determination can occur, for example, by the occurrence of an alarm, or by comparing the current date with the creation date of the data key to determine if the difference is enough to trigger the threshold condition.

At 526, a new data key identified by a new data key identifier is obtained. For example, the key management system 208 can generate the new key and provide the key identifier for the new key.

At 528, the data is decrypted using the data key to be retired. This is the last use of the old data key.

At 529, the new data key and the access control list are encrypted using the wrapping key to generate a new wrapped blob. At 530, the data is encrypted using the new data key to generate encrypted data. At 531, the new wrapped blob and the encrypted data are stored in the log structured volume. At 532, the new data key identifier is provided to the one or more users on the access control list.

At 534, the to-be-retired data key is destroyed. In some implementations, destruction of the data key occurs by over-writing the data key's storage location with null values, clearing values, ones or zeroes.

Figure 5C:
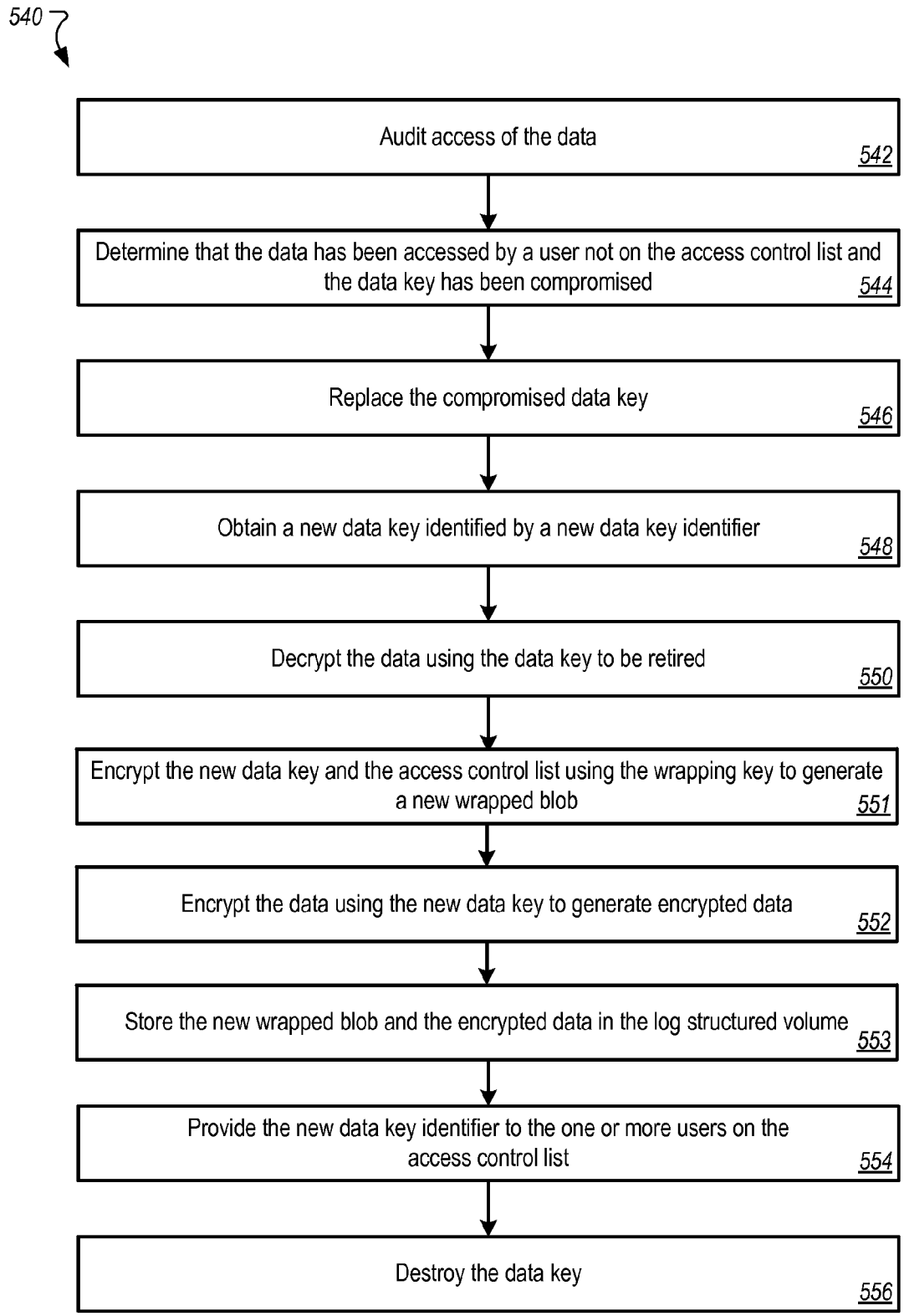
FIG. 5C is a flow diagram showing an example of a key revocation process for data keys used on virtual machines.

FIG. 5C is a flow diagram showing an example of a key revocation process 540 for data keys used on virtual machines. For example, in the event that a master key version is compromised, the master key and all data keys protected by the compromised master key can be rolled. In some implementations, rolling the data key includes re-encrypting the data contents against a newly-generated data key. The newly generated data key can be wrapped with the newly-generated primary master key. In some implementations, any data encrypted with the previous data key is destroyed.

At 542, access of the data is audited. In some implementations, auditing the date occurs by tracking processes and users who access the data. At 544, it is determined that the data has been accessed by a user not on the access control list and the data key has been compromised.

At 546, action to replace the compromised data key is initiated. At 548, a new data key identified by a new data key identifier is obtained.

At 550, the data is decrypted using the data key to be retired. This is the last use of the old data key.

At 551, the new data key and the access control list are encrypted using the wrapping key to generate a new wrapped blob. At 552, the data is encrypted using the new data key to generate encrypted data. At 553, the new wrapped blob and the encrypted data are stored in the log structured volume. At 554, the new data key identifier is provided to the one or more users on the access control list.

At 556, the old data key is destroyed. In some implementations, destruction of the data key occurs by over-writing the data key's storage location with null values, clearing values, ones or zeroes.

In some implementations, when a data key is rolled, if the data key is in active use by a VM, the conversion occurs in a non-disruptive manner. For example, the roll occurs without interrupting the VM's ability to use the disk as it normally would.

FIG. 6 shows an example of a networking architecture for a distributed system configured to run virtual machines. A distributed system can contain server systems that include host machines 615a, 615b, which are configured to run one or more virtual machines 620a, 620b, 620c, 620d. Host machines 615a, 615b use IP tunnels 660a, 660b, 660c to carry IP traffic between virtual machines 620a-d and IP traffic between the virtual machines 620a-d and VM gateways 640a, 640b. The VM gateways 640a, b are configured to provide Internet 650 access to the virtual machines 620a-d.

The host machines 615a, 615b can connect to the Internet 650 via respective local area networks (LANs) 655a, 655b. In some implementations, host machines 615a, 615b are assigned IP addresses (e.g., 134.130.78.11, 224.10.202.6) that are visible on the Internet 650. Traffic on an inter-host-machine IP tunnel 660a (e.g., IP tunnel packets) can be routed from the host machine 615 on a first LAN 655a to a host machine 615b on a second LAN 655b via the Internet 650 (tunnel 660a carries traffic between VM-1 620a and VM-13 620c). Traffic on an intra-host-machine IP tunnel 660b can be routed completely inside a host machine 615a.

The VM gateway 640a, 640b can route traffic between the Internet 650 and the virtual network 601 by changing source or destination address information in packet headers so that the address space of the virtual network 601 is hidden behind the IP address of the gateway 640a,640b. In particular, packets arriving at the gateway 640a,640b from the Internet 650 and bound for the virtual network 601 have their IP datagram destination address changed from that of the gateway 640a, 640b (e.g., 134.130.78.1, or 224.10.202.1) to the IP address of a destination VM (e.g., 192.168.1.10). Packets arriving at the gateway 640*a*, 640*b* from the virtual network 601 and bound for the Internet 650 have their IP source address changed from that of a VM (e.g., 192.168.1.10) to the IP address of the VM gateway 640*a*, 640*b* visible on the Internet 650 (e.g., 134.130.78.1, 224.10.202.1). Based on the virtual network 601 using a private subnet, the VM gateways 640*a, b* can perform network address translation (NAT) to translate between private subnet addresses and public addresses.

Virtual machines 620*a*, 620*b*, 620*c*, 620*d* running on the host machines 615*a-b* can run processes such as webserver processes that interact with browser software running on clients 630*a*, 630*b*, 630*c*. A client can be a data processing apparatus such as, for example, a server, a personal computer, a laptop computer, a smart phone, a television with one or more processors embedded therein or coupled thereto, an embedded device (e.g., a smart power meter), or a tablet computer. In this example, client 630*c* communicates with a VM (e.g., VM-21 620*d*) by sending IP packets to a VM gateway 640*b*. In turn, the VM gateway 640*b* encapsulates the packets from the client 630*c* and sends the encapsulated packets to the host machine 615*b* running VM-21 620*d* via an IP tunnel 660*c*. The host machine 615*b* running VM-21 620*d* can de-encapsulate the packets and deliver the packets to VM-21 620*d*.

IP traffic on the virtual network 140 can be carried by IP tunnels. Host machines 102, 104 can perform IP encapsulation and de-encapsulation 142 for IP traffic to and from each VM 110, 112, 114. Encapsulated IP traffic from one VM can be sent to another VM via IP tunneling. An IP tunnel can provide a transport layer. For example, IP tunneling can include sending an IP tunnel packet that includes an encapsulated packet. The encapsulated packet can be an IP packet. Other types of encapsulated packets are possible. In some cases, an IP tunnel can both originate and terminate on the same host machine (e.g., source and destination VMs are on the same host machine). In some cases, an IP tunnel can originate at one host machine and terminate at a different host machine (e.g., source and destination VMs are on different host machines). IP tunnel traffic between the host machines 102, 104 can be carried over a virtual private network (VPN) via a network 150 such as the Internet.

Host machines 102, 104 can use a virtual network routing table to retrieve the endpoint locations of the IP tunnels. In some implementations, based on an input VM identifier or VM IP address, a virtual network routing table can provide a routable IP address on network 150 that corresponds to the host machine that runs the VM associated with the input VM identifier or VM IP address.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor can receive instructions and data from a read-only memory or a random access memory or both. The essential elements of a computer are a processor for performing actions in accordance with instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a television with one or more processors embedded therein or coupled thereto, a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method implemented by one or more data processing apparatuses, the method comprising:

receiving a first request from a first virtual machine to store data in a log structured volume and based on the first request:

obtaining the data and an access control list of one or more users authorized to access the data;

obtaining a data key that has a data key identifier that identifies the data key, the data key identifier being different from the data key;

encrypting, using the one or more data processing apparatuses, the data key and the access control list using a wrapping key to generate a wrapped blob;

encrypting, using the one or more data processing apparatuses, the data using the data key to generate encrypted data;

storing the wrapped blob and the encrypted data in the log structured volume; and providing the data key identifier to one or more users on the access control list;

receiving, from a second virtual machine, a second request that identifies the data key identifier, the second request being a request to obtain a snapshot of the data; and based on the second request:

obtaining, based on the data key identifier, an unwrapped blob containing the data key and the access control list;

obtaining the data key and the access control list from the unwrapped blob; and authenticating a user associated with the second request and authorizing the user against the access control list and, upon a determination that the user is authenticated and authorized:

decrypting, using the one or more data processing apparatuses, the data using the data key; and providing a snapshot of the data to the second virtual machine;

determining that a threshold condition associated with storage of the data on the log structured volume has occurred and in response:
obtaining a new data key identified by a new data key identifier;
decrypting the data using the data key;
encrypting the new data key and the access control list using the wrapping key to generate a new wrapped blob;
encrypting the data using the new data key to generate encrypted data;
storing the new wrapped blob and the encrypted data in the log structured volume;
providing the new data key identifier to the one or more users on the access control list; and
preventing subsequent use of the data key.

2. The method of claim 1, wherein the threshold condition includes an amount of data protected by the data key.

3. The method of claim 2, wherein the amount of data protected by the data key is a cumulative amount.

4. The method of claim 2, wherein the amount of data protected by the data key is a current amount.

5. The method of claim 1, wherein the threshold condition includes a time duration that the data key has been in use.

6. The method of claim 1, wherein storing the encrypted data includes compacting the encrypted data.

7. A method implemented by one or more data processing apparatuses, the method comprising:
receiving a first request from a first virtual machine to store data in a log structured volume and based on the first request:
obtaining the data and an access control list of one or more users authorized to access the data;
obtaining a data key that has a data key identifier that identifies the data key, the data key identifier being different from the data key;
encrypting, using the one or more data processing apparatuses, the data key and the access control list using a wrapping key to generate a wrapped blob;
encrypting, using the one or more data processing apparatuses, the data using the data key to generate encrypted data;
storing the wrapped blob and the encrypted data in the log structured volume; and
providing the data key identifier to one or more users on the access control list;
receiving, from a second virtual machine, a second request that identifies the data key identifier, the second request being a request to obtain a snapshot of the data; and
based on the second request:
obtaining, based on the data key identifier, an unwrapped blob containing the data key and the access control list;
obtaining the data key and the access control list from the unwrapped blob; and
authenticating a user associated with the second request and authorizing the user against the access control list and, upon a determination that the user is authenticated and authorized:
decrypting, using the one or more data processing apparatuses, the data using the data key; and
providing a snapshot of the data to the second virtual machine;
auditing access of the data;
determining that the data has been accessed by a user that is not on the access control list and that the data key has been compromised, and in response:
obtaining a new data key identified by a new data key identifier;
decrypting the data using the data key;
encrypting the new data key and the access control list using the wrapping key to generate a new wrapped blob;
encrypting the data using the new data key to generate encrypted data;
storing the new wrapped blob and the encrypted data in the log structured volume;
providing the new data key identifier to the one or more users on the access control list; and
preventing subsequent use of the data key.

8. A system comprising:
one or more data processing apparatuses programmed to perform operations comprising:
receiving a first request from a first virtual machine to store data in a log structured volume and based on the first request:
obtaining the data and an access control list of one or more users authorized to access the data;
obtaining a data key that has a data key identifier that identifies the data key, the data key identifier being different from the data key;
encrypting the data key and the access control list using a wrapping key to generate a wrapped blob;
encrypting the data using the data key to generate encrypted data;
storing the wrapped blob and the encrypted data in the log structured volume; and
providing the data key identifier to one or more users on the access control list; and
receiving, from a second virtual machine, a second request that identifies the data key identifier, the second request being a request to obtain a snapshot of the data and based on the second request:
obtaining, based on the data key identifier, an unwrapped blob containing the data key and the access control list;
obtaining the data key and the access control list from the unwrapped blob;
authenticating a user associated with the second request and authorizing the user against the access control list and, upon a determination that the user is authenticated and authorized:
decrypting the data using the data key; and
providing a snapshot of the data to the second virtual machine:
determining that a threshold condition associated with storage of the data on the log structured volume has occurred and in response:
obtaining a new data key identified by a new data key identifier;
decrypting the data using the data key;
encrypting the new data key and the access control list using the wrapping key to generate a new wrapped blob;
encrypting the data using the new data key to generate encrypted data;
storing the new wrapped blob and the encrypted data in the log structured volume;
providing the new data key identifier to the one or more users on the access control list; and
preventing subsequent use of the data key.

9. The system of claim 8, wherein the threshold condition includes an amount of data protected by the data key.

10. The system of claim 9, wherein the amount of data protected by the data key is a cumulative amount.

11. The system of claim 9, wherein the amount of data protected by the data key is a current amount.

12. The system of claim 8, wherein the threshold condition includes a time duration that the data key has been in use.

13. The system of claim 8, wherein storing the encrypted data includes compacting the encrypted data.

14. A system comprising:
one or more data processing apparatuses programmed to perform operations comprising:
receiving a first request from a first virtual machine to store data in a log structured volume and based on the first request:
obtaining the data and an access control list of one or more users authorized to access the data;
obtaining a data key that has a data key identifier that identifies the data key, the data key identifier being different from the data key;
encrypting the data key and the access control list using a wrapping key to generate a wrapped blob;
encrypting the data using the data key to generate encrypted data;
storing the wrapped blob and the encrypted data in the log structured volume; and
providing the data key identifier to one or more users on the access control list; and
receiving, from a second virtual machine, a second request that identifies the data key identifier, the second request being a request to obtain a snapshot of the data and based on the second request:
obtaining, based on the data key identifier, an unwrapped blob containing the data key and the access control list;
obtaining the data key and the access control list from the unwrapped blob;
authenticating a user associated with the second request and authorizing the user against the access control list and, upon a determination that the user is authenticated and authorized:
decrypting the data using the data key; and
providing a snapshot of the data to the second virtual machine;
auditing access of the data;
determining that the data has been accessed by a user that is not on the access control list and that the data key has been compromised, and in response:
obtaining a new data key identified by a new data key identifier;
decrypting the data using the data key;
encrypting the new data key and the access control list using the wrapping key to generate a new wrapped blob;
encrypting the data using the new data key to generate encrypted data;
storing the new wrapped blob and the encrypted data in the log structured volume;
providing the new data key identifier to the one or more users on the access control list; and
preventing subsequent use of the data key.

15. A non-transitory storage medium having instructions stored thereon that, when executed, cause data processing apparatus to perform operations comprising:
receiving a first request from a first virtual machine to store data in a log structured volume and based on the first request:
obtaining the data and an access control list of one or more users authorized to access the data;
obtaining a data key that has a data key identifier that identifies the data key, the data key identifier being different from the data key;
encrypting the data key and the access control list using a wrapping key to generate a wrapped blob;
encrypting the data using the data key to generate encrypted data;
storing the wrapped blob and the encrypted data in the log structured volume; and
providing the data key identifier to one or more users on the access control list;
receiving, from a second virtual machine, a second request that identifies the data key identifier, the second request being a request to obtain a snapshot of the data and based on the second request:
obtaining, based on the data key identifier, an unwrapped blob containing the data key and the access control list;
obtaining the data key and the access control list from the unwrapped blob; and
authenticating a user associated with the second request and authorizing the user against the access control list and, upon a determination that the user is authenticated and authorized:
decrypting the data using the data key; and
providing a snapshot of the data to the second virtual machine;
determining that a threshold condition associated with storage of the data on the log structured volume has occurred and in response:
obtaining a new data key identified by a new data key identifier;
decrypting the data using the data key;
encrypting the new data key and the access control list using the wrapping key to generate a new wrapped blob;
encrypting the data using the new data key to generate encrypted data;
storing the new wrapped blob and the encrypted data in the log structured volume;
providing the new data key identifier to the one or more users on the access control list; and
preventing subsequent use of the data key.

16. The non-transitory storage medium of claim 15, wherein the threshold condition includes an amount of data protected by the data key.

17. The non-transitory storage medium of claim 16, wherein the amount of data protected by the data key is a cumulative amount.

18. The non-transitory storage medium of claim 16, wherein the amount of data protected by the data key is a current amount.

19. The non-transitory storage medium of claim 15, wherein the threshold condition includes a time duration that the data key has been in use.

20. The non-transitory storage medium of claim 15, wherein storing the encrypted data includes compacting the encrypted data.

21. A non-transitory storage medium having instructions stored thereon that, when executed, cause data processing apparatus to perform operations comprising:
receiving a first request from a first virtual machine to store data in a log structured volume and based on the first request:

obtaining the data and an access control list of one or more users authorized to access the data;

obtaining a data key that has a data key identifier that identifies the data key, the data key identifier being different from the data key;

encrypting the data key and the access control list using a wrapping key to generate a wrapped blob;

encrypting the data using the data key to generate encrypted data;

storing the wrapped blob and the encrypted data in the log structured volume; and providing the data key identifier to one or more users on the access control list;

receiving, from a second virtual machine, a second request that identifies the data key identifier, the second request being a request to obtain a snapshot of the data and based on the second request:

obtaining, based on the data key identifier, an unwrapped blob containing the data key and the access control list;

obtaining the data key and the access control list from the unwrapped blob; and authenticating a user associated with the second request and authorizing the user against the access control list and, upon a determination that the user is authenticated and authorized:

decrypting the data using the data key; and providing a snapshot of the data to the second virtual machine;

auditing access of the data;

determining that the data has been accessed by a user that is not on the access control list and that the data key has been compromised, and in response:

obtaining a new data key identified by a new data key identifier;

decrypting the data using the data key;

encrypting the new data key and the access control list using the wrapping key to generate a new wrapped blob;

encrypting the data using the new data key to generate encrypted data;

storing the new wrapped blob and the encrypted data in the log structured volume;

providing the new data key identifier to the one or more users on the access control list; and preventing subsequent use of the data key.

* * * * *